US012528338B2

(12) United States Patent
Tong et al.

(10) Patent No.: US 12,528,338 B2
(45) Date of Patent: Jan. 20, 2026

(54) HEATING DEVICE (71) Applicant: VALEO AUTOMOTIVE AIR CONDITIONING HUBEI CO., LTD., Hubei (CN)

(72) Inventors: Ziran Tong, Hubei (CN); Qiang Geng, Hubei (CN)

(73) Assignee: VALEO AUTOMOTIVE AIR CONDITIONING HUBEI CO., LTD., Jingzhou (CN)

( * ) Notice: Subject to any disclaimer, the term of this patent is extended or adjusted under 35 U.S.C. 154(b) by 1087 days.

(21) Appl. No.: 17/537,876

(22) Filed: Nov. 30, 2021

(65) Prior Publication Data

US 2022/0088998 A1 Mar. 24, 2022

Related U.S. Application Data (63) Continuation of application No. PCT/CN2020/093060, filed on May 29, 2020.

(51) Int. Cl.
*F24H 3/04* (2022.01)
*B60H 1/22* (2006.01)
(Continued)

(52) U.S. Cl.
CPC ......... *B60H 1/2218* (2013.01); *F24H 3/0429* (2013.01); *H05B 1/0236* (2013.01); *H05B 3/06* (2013.01); *H01R 12/55* (2013.01); *H01R 24/66* (2013.01); *H01R 2101/00* (2013.01); *H05B 2203/016* (2013.01); *H05B 2203/023* (2013.01)

(58) Field of Classification Search
None
See application file for complete search history.

(56) References Cited

U.S. PATENT DOCUMENTS 9,161,391 B2 * 10/2015 Niederer ................. F24H 15/37
10,806,022 B2 * 10/2020 Lim ..................... H05K 1/0207
(Continued)

FOREIGN PATENT DOCUMENTS

CN 101453060 A 6/2009
CN 101533833 A 9/2009
(Continued)

OTHER PUBLICATIONS

Office Action issued in counterpart Chinese Application No. 201910469593.9, dated Jul. 1, 2023 (17 pages).
(Continued)

*Primary Examiner* — Thor S Campbell
(74) *Attorney, Agent, or Firm* — Osha Bergman Watanabe & Burton LLP (57) ABSTRACT

A heating device (100) for a vehicle, includes a Printed Circuit Board (11), at least one heating element (20a,20b, 20c), a bus bar (30,31) and a terminal pin (42). The Printed Circuit Board (11) is received inside a casing (12) along one bus bar (30,31). The bus bar (30,31) includes at least one bus bar terminal (30a,30b,30c,31a,31b,31c), wherein at least one bus bar terminal (30a 30b 30c 31a,31b,31c) connects a corresponding heating element (20a,20b,20c) to the Printed Circuit Board (11). The terminal pin (42) is integrally formed with at least one bus bar terminal (30a,30b,30c,31a, 31b,31c) and is disposed outside the casing (12).

9 Claims, 8 Drawing Sheets (51) Int. Cl.
*H05B 1/02* (2006.01)
*H05B 3/06* (2006.01)
*H01R 12/55* (2011.01)
*H01R 24/66* (2011.01)
*H01R 101/00* (2006.01)

(56) References Cited

U.S. PATENT DOCUMENTS

| | | | |
|---|---|---|---|
| 11,035,589 B2* | 6/2021 | Bohlender | B60H 1/2215 |
| 2008/0000889 A1* | 1/2008 | Niederer | F24H 3/082 |
| | | | 219/205 |
| 2017/0295613 A1* | 10/2017 | Kim | H05B 3/22 |
| 2022/0169092 A1* | 6/2022 | Tong | B60H 1/034 |
| 2022/0361295 A1* | 11/2022 | Tellier | H05B 3/06 |

FOREIGN PATENT DOCUMENTS

| | | |
|---|---|---|
| CN | 102362374 A | 2/2012 |
| CN | 102548246 A | 7/2012 |
| CN | 104094680 A | 10/2014 |
| CN | 105164862 A | 12/2015 |
| CN | 105165114 A | 12/2015 |
| CN | 105210456 A | 12/2015 |
| CN | 107323215 A | 11/2017 |
| DE | 102009032621 A1 | 1/2010 |
| EP | 1884383 A1 | 2/2008 |
| EP | 2330865 B1 | 10/2015 |
| EP | 3228950 A1 | 10/2017 |
| EP | 3291640 A1 | 3/2018 |
| EP | 3299743 A1 | 3/2018 |
| KR | 20100011514 A | 2/2010 |
| KR | 20120013558 A | 2/2012 |
| KR | 20160065354 A | 6/2016 |

OTHER PUBLICATIONS

International Search Report and Written Opinion issued in corresponding International Patent Application No. PCT/CN2020/093060, mailed on Aug. 31, 2020 (8 pages).

Extended European Search Report issued in European Application No. 20812575.7 mailed on May 22, 2023 (7 pages).

* cited by examiner

FIG. 1

(PRIOR ART)

HEATING DEVICE

The present invention relates to a heating device, particularly, the present invention relates to Printed Circuit Board (PCB) controlled heating device for use in vehicles.

Generally, high current handling Printed Circuit Board (PCB) were conventionally configured of copper, however, Printed Circuit Board of such configuration are expensive. Accordingly, a bus-bar embedded Printed Circuit Board (PCB) is preferred as such configuration of bus-bar system enables configuring or assembling of different parts on bus-bar terminals of the bus-bar system and the bus-bar terminals distribute power to the different parts. The bus-bar system includes a plurality of bus-bar terminals, where one end of each of the bus-bar terminals is connected to a heating element of a heating device such as, for example, a heater used in a vehicle and the other end of the bus-bar terminal is connected to the Printed Circuit Board (PCB). The Bus bar terminals are often metallic strips of conductive material such as copper, brass, or aluminum that both ground and conduct electricity. For example, the heating element may be used for cold starting of an engine of a vehicle or the heating element is configured at downstream of an evaporator of a Heating Ventilation and Air Conditioning unit used in the vehicle for achieving and maintaining comfort conditions inside a vehicle cabin. Also, such configuration of the bus bar embedded PCB results in effective heat dissipation by combining copper inlay.

Figure 1:
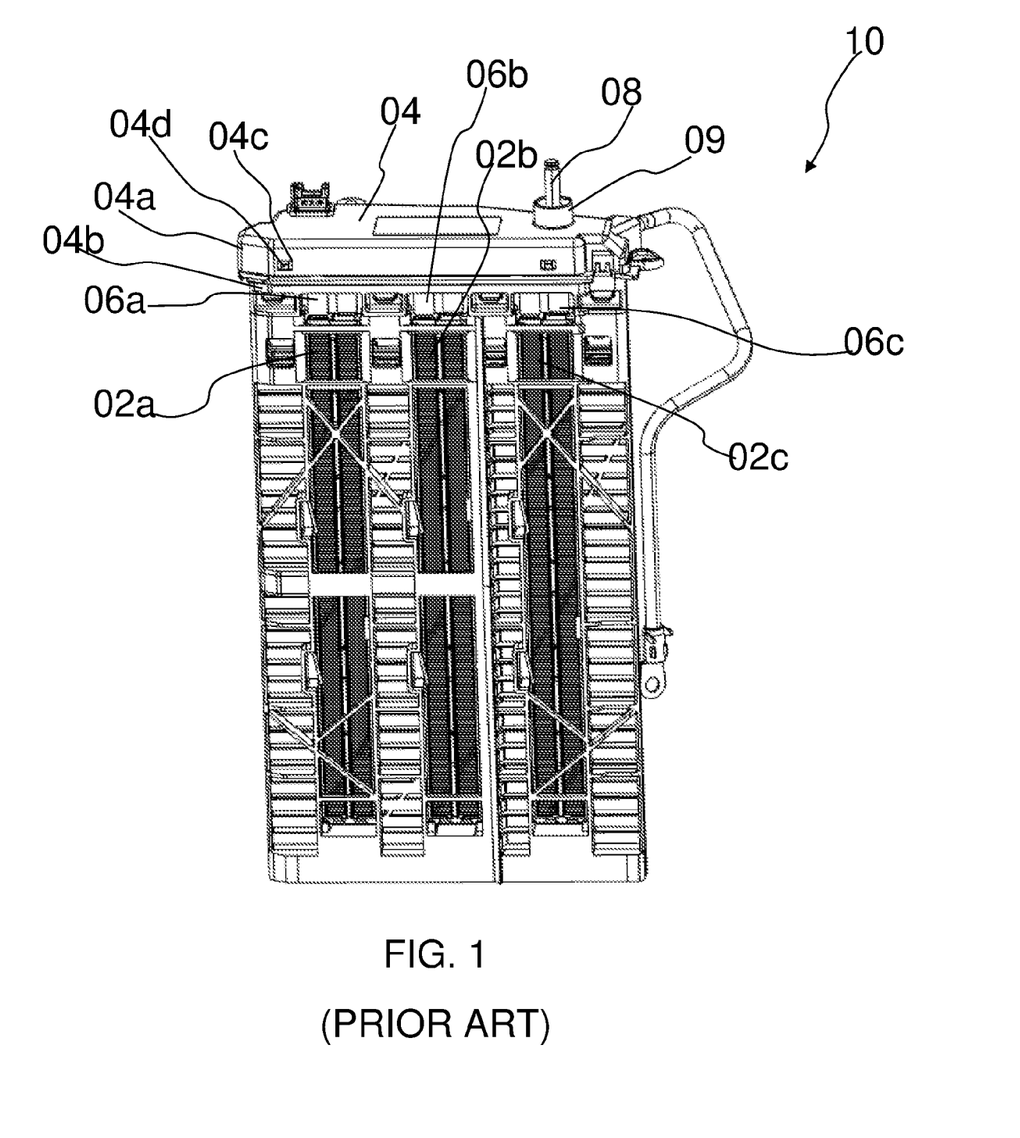
FIG. 1 illustrates a heating device in accordance with the prior art, wherein a power connector housing protrudes out of a Printed Circuit Board (PCB) casing from a top face of the Printed Circuit Board (PCB) casing.

FIG. 1 illustrates a schematic representation of a heating device 10 in accordance with the prior art that includes a plurality of heating elements 02a-02c. Generally, such heating elements 02a-02c of the heating device 10 used in vehicle environment are required to be strategically placed and packaged in a limited available space, for example, in case the heating device 10 is for cold starting of the engine then the heating device 10 is required to be placed near the engine of the vehicle and in confined space of an engine compartment. In case the heating device 10 is used in Heating Ventilation and Air conditioning system, the heating device 10 is disposed at downstream of the evaporator in a confined space inside the Heating Ventilation and Air conditioning housing. As such there are not many options for packaging of the heating device 10 in the available confined space and the position of the heating elements 02a-02c is fixed. The conventional bus-bar embedded Printed Circuit Board (PCB) (not illustrated in FIG. 1) is disposed inside a casing 04 for protecting the delicate circuitry configured on the Printed Circuit Board (PCB). As bus-bar terminals 06a-06c emanating from the Printed Circuit Board (PCB) are connected to the heating elements 02a-02c, the casing 04 covering and holding the Printed Circuit Board (PCB) is required to be disposed in-line or aligned with the heating elements 02a-02c. Accordingly, position and size of the casing 04 holding the Printed Circuit Board (PCB) is fixed and also there is no scope of changing position of the casing 04 or increasing volume or height or size of the casing 04 due to limited or no space for expansion in vertical direction.

Generally, the casing 04 is having a modular construction and is assembled by connecting separate parts 04a and 04b, wherein complimentary engagement elements 04c and 04d configured on the parts 04a and 04b facilitate assembly and dis-assembly between the parts 04a and 04b to provide modular configuration to the casing 04. The casing 04 covering and holding the Printed Circuit Board (PCB) also holds a positive terminal pin 08 and a power connector (not illustrated in FIG. 1), where o the power connector is connected to a cable supplying operating power and also detachably engages with the positive terminal pin 08 disposed inside the casing 04. However, there are drawbacks associated with disposing the positive terminal pin and the power connector engaging with each other inside a confined space inside the Printed Circuit Board (PCB) casing. Specifically, enough space is not available inside the PCB casing for configuring secure connection between the terminal pin and the power connector. Further, due to size and position of the casing being fixed and confined space inside the casing, there are limited options for placement and configuration of the positive terminal pin and the power connector engaging with the positive terminal pin. The PCB casing is required to be modified to adjust according to the different configurations and placements of the positive terminal pin and the power connector received therein, however, modifying the PCB casing is undesirable considering packaging limitations and size constraints associated with the PCB casing. Also, in case the terminal pin and the power connector are received in and engaging with each other inside the PCB casing, the other electronic elements disposed inside the PCB casing may get damaged while the terminal pin and the power connector are being connected to each other. Alternatively, at least a portion of the positive terminal pin 08 extends out of the casing 04 through an aperture configured on a top face of the casing 04 and is received in a power connector housing 09 disposed over the top face of the casing 04 and around the aperture formed on the top face of the casing 04. More specifically, the power connector housing 09 is having tubular configuration with at least one open extreme end, wherein the open end of the power connector housing 09 facilitates engagement between the power connector and the positive terminal pin 08. However, such configuration of the power connector housing 09 disposed over the top face of the casing 04 is not recommended due to limited or no space above the top face of the casing 04 in vertical direction. Also, enough space is not available above the casing 04 for configuring secure connection between the positive terminal pin 08 and the power connector. With such configuration of the power connector housing 09 disposed over the top face of the casing 04, there are limited options for placement and configuration of the positive terminal pin 08 and the power connector engaging with the positive terminal pin 08.

Accordingly, there is a need for a heating device that obviates drawbacks associated with conventional heating devices in which a positive terminal pin and power connector is disposed in a confined space either inside a Printed Circuit Board (PCB) casing or above the top face of the Printed Circuit Board (PCB) casing. Further, there is a need for a heating device with an arrangement for configuring secure connection between terminal pin and any configuration of power connector without need for modifying the Printed Circuit Board (PCB) casing. Further, there is a need for a heating device that provides flexibility to position or select different shape, size and configurations of the engaging positive terminal pin and power connector. Furthermore, there is a need for a heating device that ensures normal secure connection between terminal pin and the power connector without damaging electronic elements disposed inside the PCB casing. Still further, there is a need for a heating device that ensures that sufficient space is available for configuring connection between the power connector and the positive terminal pin.

An object of the present invention is to provide a heating device that obviates drawbacks associated with conventional heating devices in which a positive terminal pin and power connector are disposed in a confined space either inside a Printed Circuit Board (PCB) casing or above a top face of the Printed Circuit Board (PCB) casing.

Another object of the present invention is to provide a heating device with an arrangement for configuring secure connection between terminal pin and any configuration of power connector without need for modifying the PCB casing.

Still another object of the present invention is to provide a heating device that provides flexibility to position or select different shape, size and configurations of the engaging terminal pin and power connector.

Another object of the present invention is to provide a heating device that ensures normal secure connection between terminal pin and the power connector without damaging electronic or other delicate elements disposed inside the PCB casing.

Yet another object of the present invention is to provide a heating device that ensures that sufficient space is available for configuring connection between the power connector and the terminal pin.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

A heating device is disclosed in accordance with an embodiment of the present invention. The heating device includes a Printed Circuit Board, at least one heating element, a pair of bus bars and a terminal pin. The Printed Circuit Board is received inside a casing. The pair of bus bars is connected to the Printed Circuit Board (PCB), at least one bus bar is configured with at least one bus bar terminal that at least partially extends out of the casing and facilitates connection between at least one heating element and the Printed Circuit Board (PCB). The terminal pin is connected with the at least one bus bar terminal and is disposed outside the casing.

Specifically, the terminal pin is disposed totally outside the casing. In other words, the terminal pin is deported from the casing and outside the volume defined by the casing.

Specifically, the terminal pin is received inside a power connector housing disposed outside the casing.

Generally, the power connector housing extends out of the casing from a side of the casing.

Specifically, the power connector housing is having tubular configuration with a closed end forming a base portion, an open extreme end and an open side.

Generally, the power connector housing includes at least one supporting member that extends there from and is received inside the casing and over the bus bars.

Specifically, the supporting member further supports the Printed Circuit board (PCB) thereon.

Further, the power connector housing receives a power connector that engages with the terminal pin received in the power connector housing.

In accordance with an embodiment of the present invention, the casing includes a first portion and a second portion configured with complimentary engaging elements for facilitating engagement between the first portion and the second portion to configure an enclosure.

Specifically, the complimentary engaging elements are apertures and complimentary snap fit engagement elements respectively.

In accordance with an embodiment of the present invention, the terminal pin is integrally formed on a portion of the bus bar extending out of the casing.

Alternatively, the terminal pin is detachably mounted on a portion of the bus bar extending out of the casing.

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein:

FIG. 6 illustrates another isometric view of the heating device of FIG. 2a; and

It must be noted that the figures disclose the invention in a detailed enough way to be implemented, said figures helping to better define the invention if needs be. The invention should however not be limited to the embodiment disclosed in the description.

A Printed Circuit Board (PCB) controlled heating device of the present invention is configured with a power connector housing for configuring secure connection between a terminal pin and a power connector outside a Printed Circuit Board (PCB) casing. At least one bus bars of a pair of bus bars received in the Printed Circuit Board (PCB) casing facilitates connection between the Printed Circuit Board (PCB) and the heating elements. The terminal pin is connected to a portion of a bus-bar extending out of the Printed Circuit Board (PCB) casing, accordingly, the bus bar is received inside the Printed Circuit Board (PCB) casing whereas the terminal pin extends out of the Printed Circuit Board (PCB) casing. With such configuration, power connector interface is configured outside the Printed Circuit Board (PCB) casing and as such flexibility to select any configuration of engaging power connector and terminal pin is achieved. The heating device of the present invention is generally used in a Heating Ventilation and Air Conditioning (HVAC) system or a cold starting system of a vehicle, however, the heating device of the present invention can be used in any vehicular and non vehicular applications in which the engaging positive terminal pin and power connector configuring the power connector interface are required to be disposed outside the Printed Circuit Board (PCB) casing instead of being disposed inside a confined space either inside the Printed Circuit Board (PCB) casing or above the top face of the Printed Circuit Board (PCB) casing. Such configuration provides sufficient space for enabling secure connection between terminal pin and any configuration of power connector without need to modify the PCB casing and providing flexibility to position or select different shape, size and configuration of the engaging terminal pin and power connector.

FIG. 1 illustrates a heating device 10 in accordance with the prior art. The heating device 10 can be a heater used for cold starting of an engine of a vehicle or a heater disposed downstream of an evaporator of a Heating Ventilation and Air Conditioning unit used in the vehicle for achieving and maintaining comfort conditions inside a vehicle cabin. In case of the conventional heating device 10, an interface or connection between a positive terminal pin 08 and a power connector is configured in a confined space either inside a Printed Circuit Board (PCB) casing or above the top face of the Printed Circuit Board (PCB) casing 04. However, due to limited or no space above the casing 04 in vertical direction, enough space is not available for configuring secure connection between the positive terminal pin 08 and the power connector. Further, with such configuration, there are limited options for placement and configurations of the positive terminal pin 08 and the power connector engaging with the positive terminal pin 08.

Figure 2A:
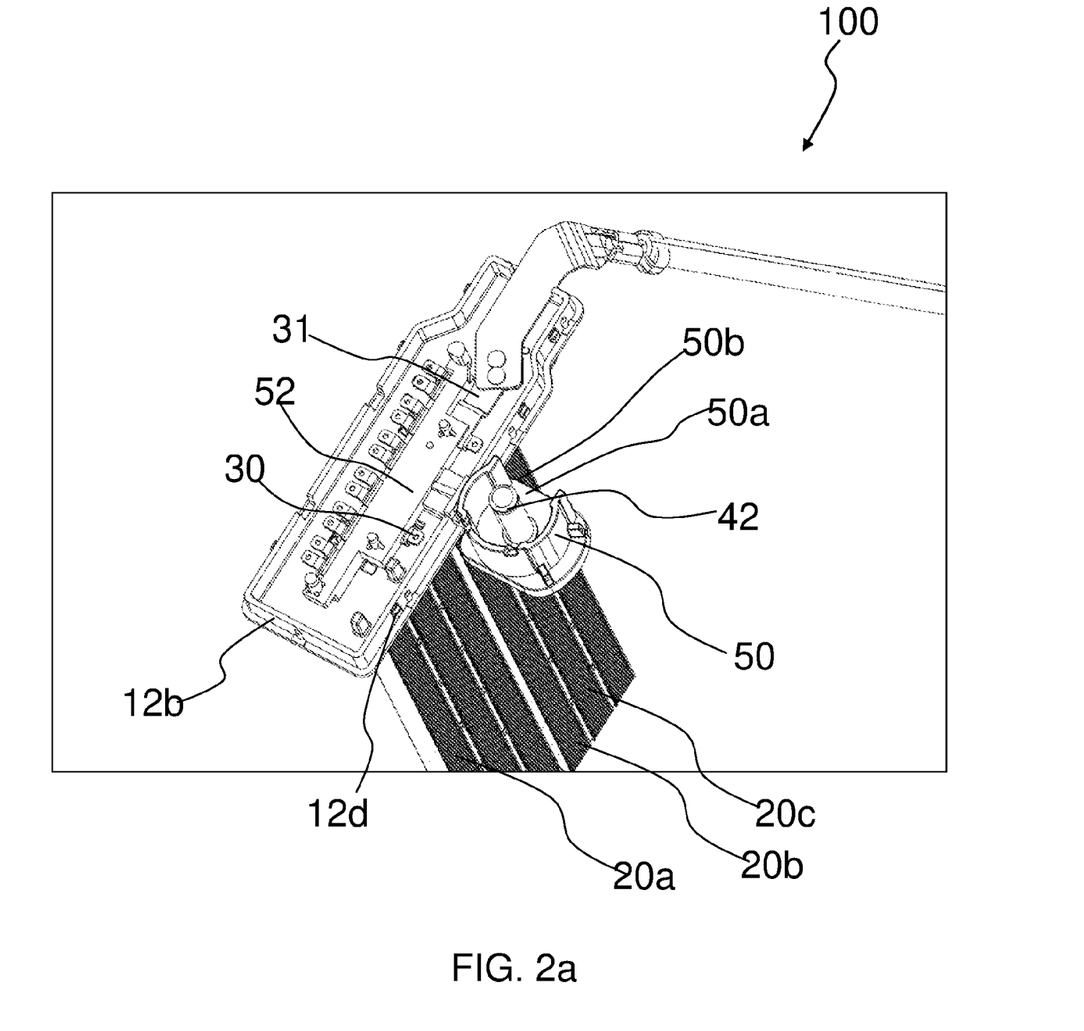
FIG. 2a illustrates an isometric view of a heating device in accordance with an embodiment of the present invention without depicting a top part of the Printed Circuit Board (PCB) casing and a Printed Circuit Board (PCB), wherein a power connector housing extends out of the Printed Circuit Board (PCB) casing from a side of the Printed Circuit Board (PCB) casing.
Figure 2B:
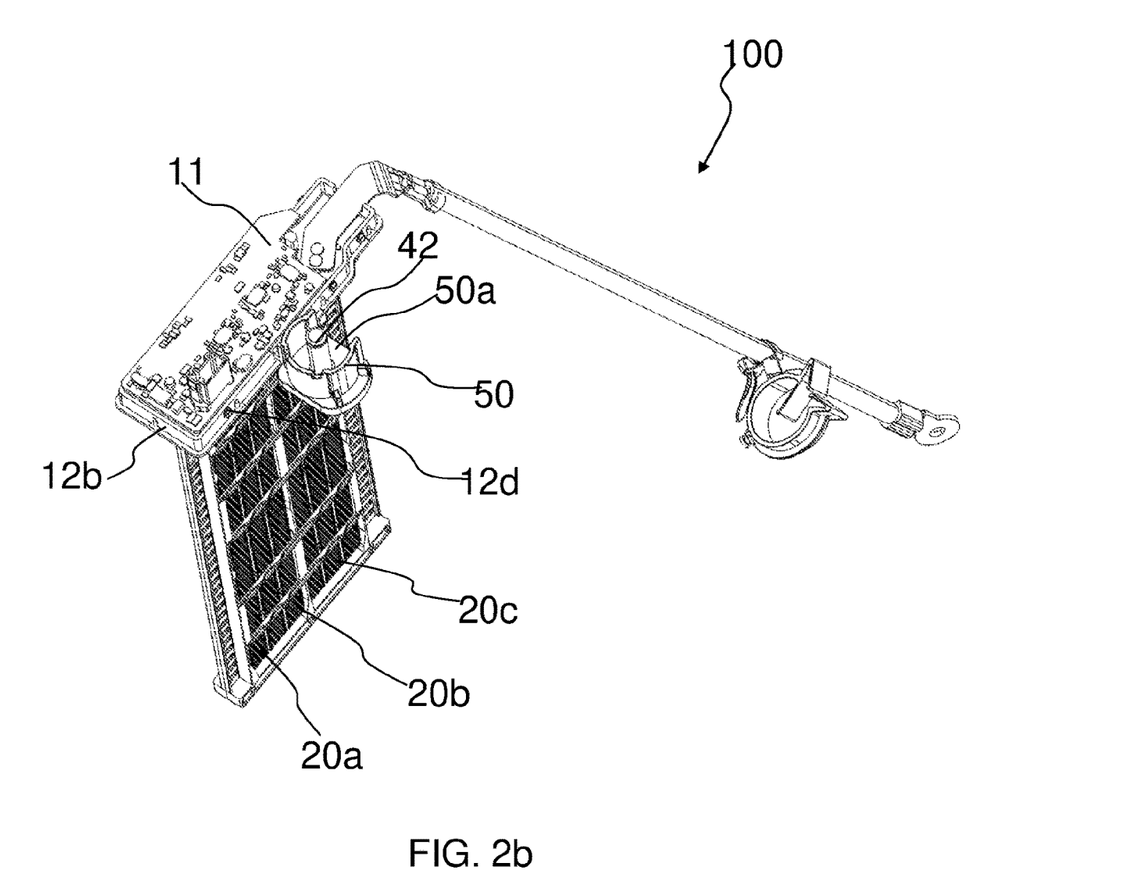
FIG. 2b illustrates another isometric view of the heating device of FIG. 2a with the Printed Circuit Board (PCB) received inside the Printed Circuit Board (PCB) casing.
Figure 3:
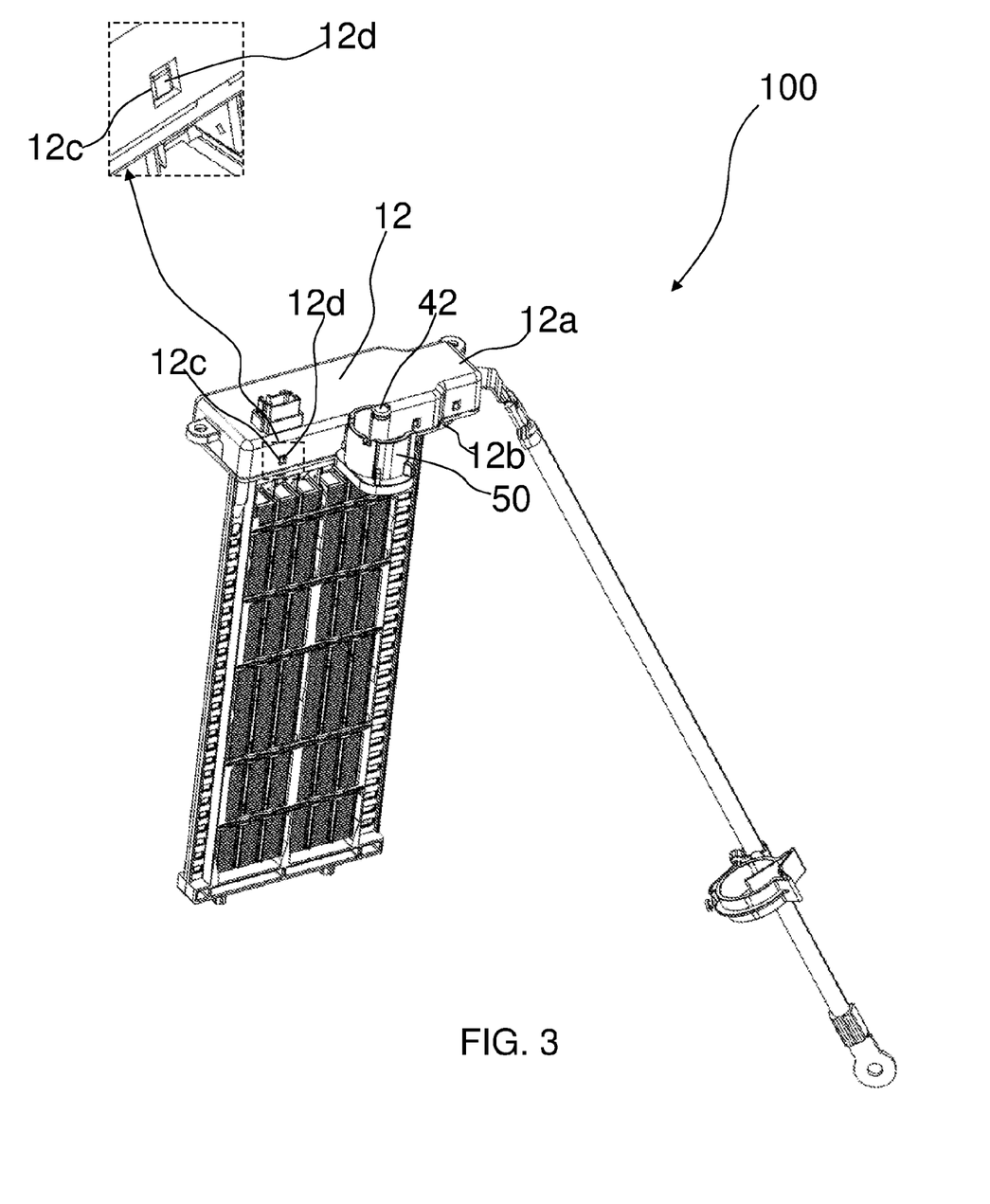
FIG. 3 illustrates another isometric view of the heating device of FIG. 2b with the top part of the Printed Circuit Board (PCB) casing covering the Printed Circuit Board (PCB), also is illustrated an enlarged view depicting engagement between top and bottom parts of the Printed Circuit Board (PCB) casing.

Referring to FIG. 2a-FIG. 2b, a Printed Circuit Board (PCB) controlled heating device 100 in accordance with an embodiment of the present invention is illustrated. The heating device 100 includes a Printed Circuit Board (PCB) 11, at least one heating element 20a, 20b, 20c, a pair of bus bars 30 and 31 and a terminal pin 42, also referred to as positive terminal pin. The Printed Circuit Board (PCB) 11 and the bus bars 30, 31 are received inside a Printed Circuit Board (PCB) casing 12, also, simply referred to as the casing 12. Referring to the FIG. 3 of the accompanying drawings, the casing 12 includes a first portion 12a and a second portion 12b configured with complimentary engaging elements 12c and 12d for facilitating engagement between the first portion 12a and the second portion 12b to configure an enclosure. The FIG. 3 also illustrates an enlarged view of the engagement between the complimentary engaging elements 12c and 12d. The complimentary engaging elements 12c and 12d are apertures and complimentary snap fit engagement elements respectively. However, the present invention is not limited to any particular configuration of the casing 12 as far as the casing 12 is having a modular configuration and defines enclosure for receiving the Printed Circuit Board (PCB) 11 along with the bus bars 30, 31 and other elements. Further, the present invention is not limited to any particular configuration of the complimentary engaging elements 12c and 12d as far as the complimentary engagement elements are capable of configuring engagement between the first portion 12a and the second portion 12b to impart modular configuration to the casing 12. Such modular configuration of the casing 12 provides access to the elements received inside the casing 12 for maintenance and replacement, thereby easing the maintenance.

Figure 4A:
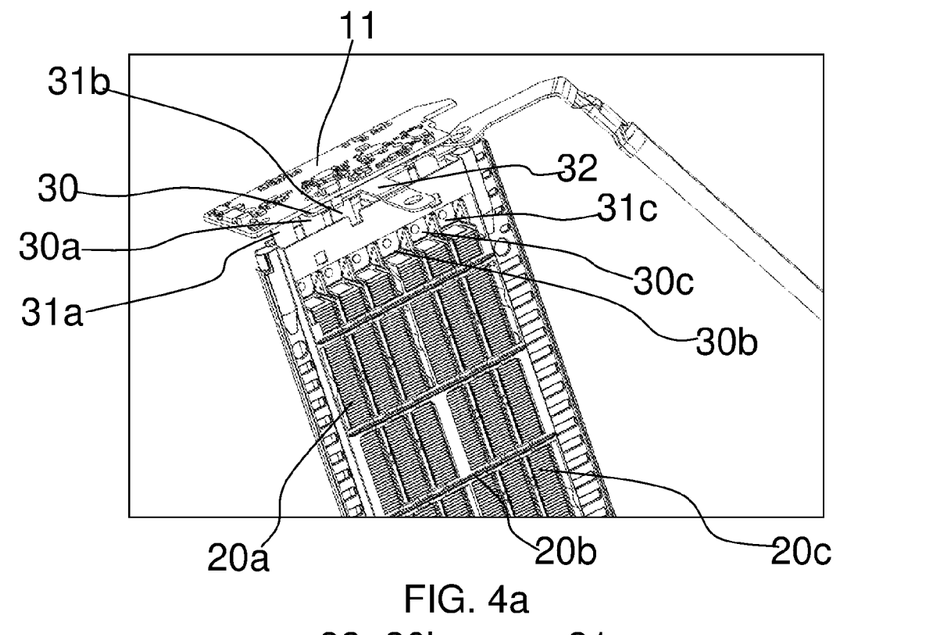
FIG. 4a illustrates a schematic representation of the heating device of FIG. 3 without depicting the Printed Circuit Board (PCB) casing.
Figure 4B:
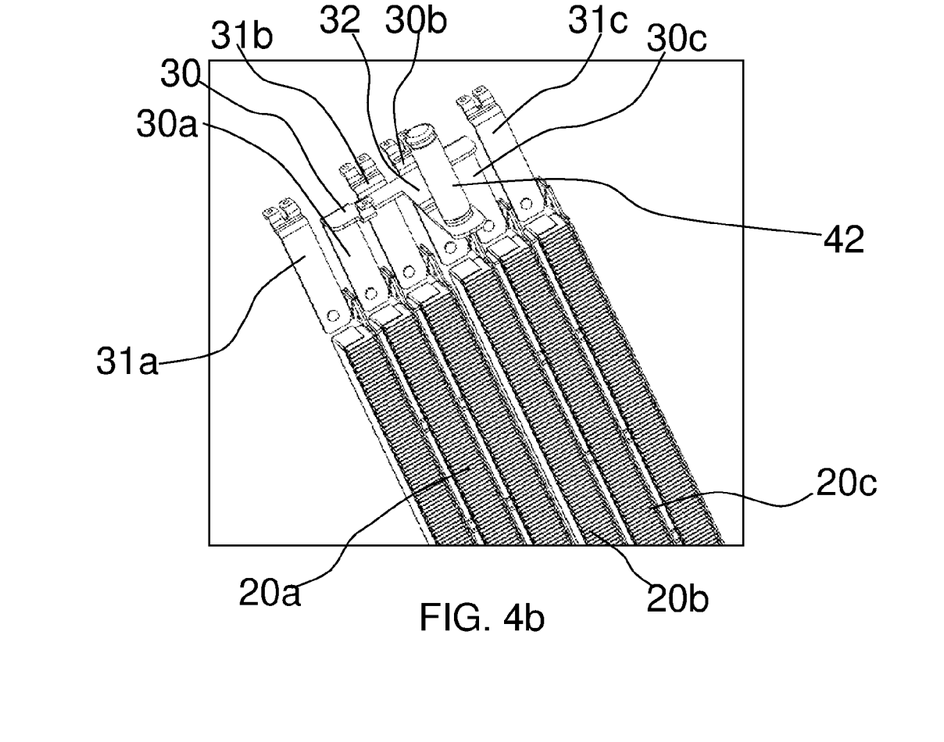
FIG. 4b illustrates a schematic representation of the heating device of FIG. 3 without depicting the Printed Circuit Board (PCB) casing and the Printed Circuit Board (PCB)

Referring to the FIG. 4a and FIG. 4b of the accompanying drawings, the bus bar 30 includes at least one bus bar terminal 30a, 30b, 30c, wherein at least one of the bus bar terminals 30a, 30b, 30c connect at least one of the corresponding heating elements 20a, 20b, 20c to the Printed Circuit Board (PCB) 11. Specifically, the bus bar terminals 30a and 30c connect the respective heating elements 20a and 20c to the Printed Circuit Board (PCB) 11. Referring to FIG. 4b of the accompanying drawings, the terminal pin 42 is connected with at least one of the bus bar terminals 30a, 30b, 30c of the bus bar 30 and is disposed outside the casing 12. Specifically, the terminal pin 42 is connected to a portion 32 of the bus-bar 30 extending out of the casing 12 in such a way that the bus bar 30 is inside the casing 12, whereas the terminal pin 42 is disposed outside the casing 12. More specifically, the bus bar 30 connects the bus bar terminals 30a and 30c that are at least partially extending out of the casing 12 to be connected with the heating elements 20a and 20c. The terminal pin 42 is mounted on the outwardly extending portion 32 of the bus bar 30 that extends out of the casing 12. A power connector 40 as illustrated FIG. 5a supplies operating power to the bus bar terminals 30a and 30c that are connected to the power connector 40 via the terminal pin 42. The bus bar terminal 30a and the bus bar terminal 30c act as the positive terminals. Particularly, the bus bar terminal 30a facilitates in supplying operating power to one of the heating elements of the pair of heating elements 20a and the bus bar terminal 30c facilitates in supplying operating power to one of the heating elements of the pair of heating elements 20c. One end of the bus bar terminal 31a is connected to a heating element of the pair of heating elements 20a that is other than the heating element to which operating power is supplied by the bus bar terminal 30a. Similarly, one end of the bus bar terminal 31c is connected to the heating element of the pair of heating elements 20c that is other than the heating element to which operating power is supplied by the bus bar terminal 30c. The other end of the bus bar terminals 31a and 31c are connected to the bus bar 31 via the Printed Circuit Board (PCB) 11. The bar terminals 31a and 31c extending from the bus bar 31 act as the negative terminals, with such configuration, the transmission of the electric power from the bus bar terminals 30a and 30c acting as positive terminals to the bus bar terminals 31a and 31c acting as negative terminals and through the heating elements 20a and 20c is controlled by the Printed Circuit Board (PCB) 11. The bus bar terminals 31b and 30b, one acting as positive terminal and other acting as negative terminal directly connect separate heating elements of the pair heating elements 20b to the Printed Circuit Board (PCB) 11.

Generally, the terminal pin 42 is connected to the portion 32 of the bus bar 30 extending out of the casing 12. In one embodiment, the terminal pin 42 is integrally formed on the portion 32 of the bus bar 30 extending out of the casing 12. Alternatively, the terminal pin 42 is detachably mounted on the portion 32 of the bus bar 30 extending out of the casing 12. Specifically, the terminal pin 42 is either removably received in an aperture 42a or secured to the aperture 42a formed on the portion 32 of the bus bar 30 extending out of the casing 12. Further, the terminal pin 42 is received inside a power connector housing 50 disposed outside the casing 12.

Figure 5A:
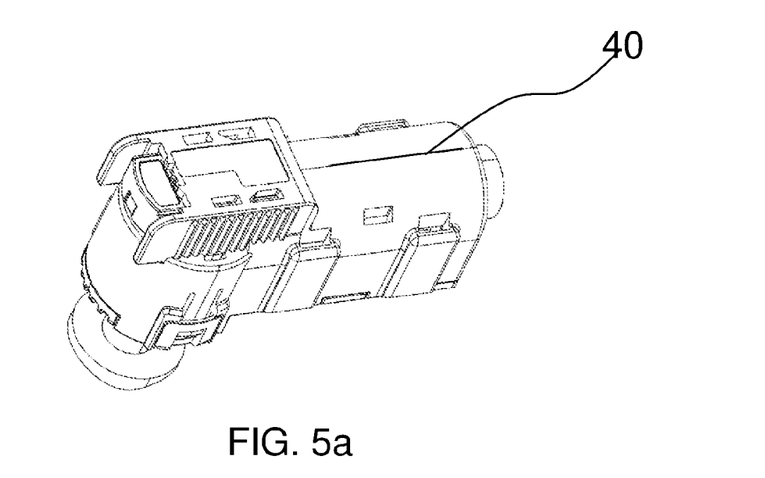
FIG. 5a illustrates an isometric view of a power connector in accordance with an embodiment of the present invention.
Figures 5B, 5C:
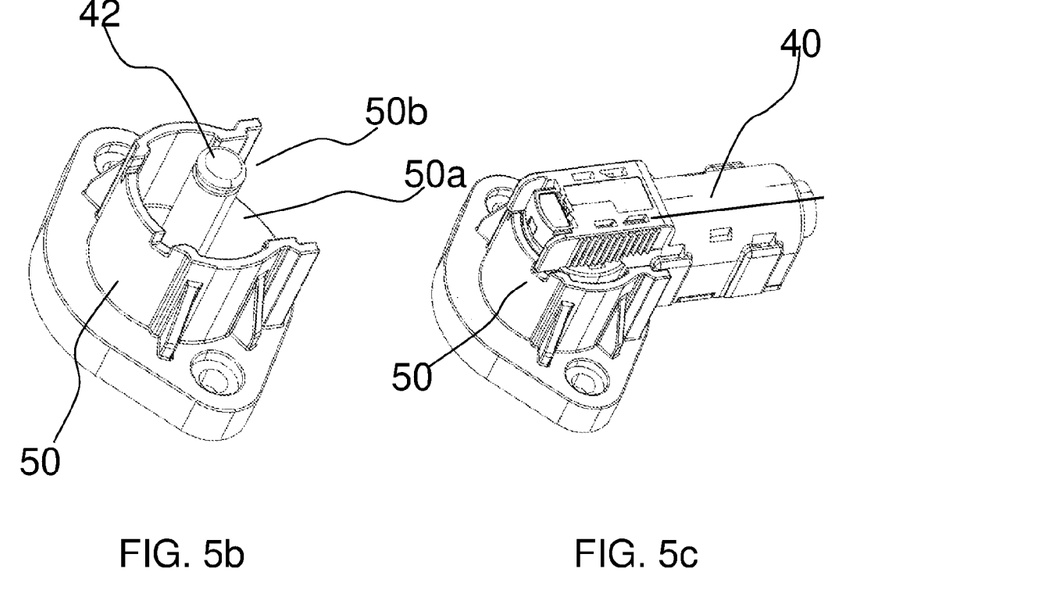
FIG. 5b illustrates an isometric view of a power connector housing in accordance with an embodiment of the present invention.
FIG. 5c illustrates an isometric view of an assembly between the power connector of FIG. 5a and the power connector housing of FIG. 5b.
Figure 6:
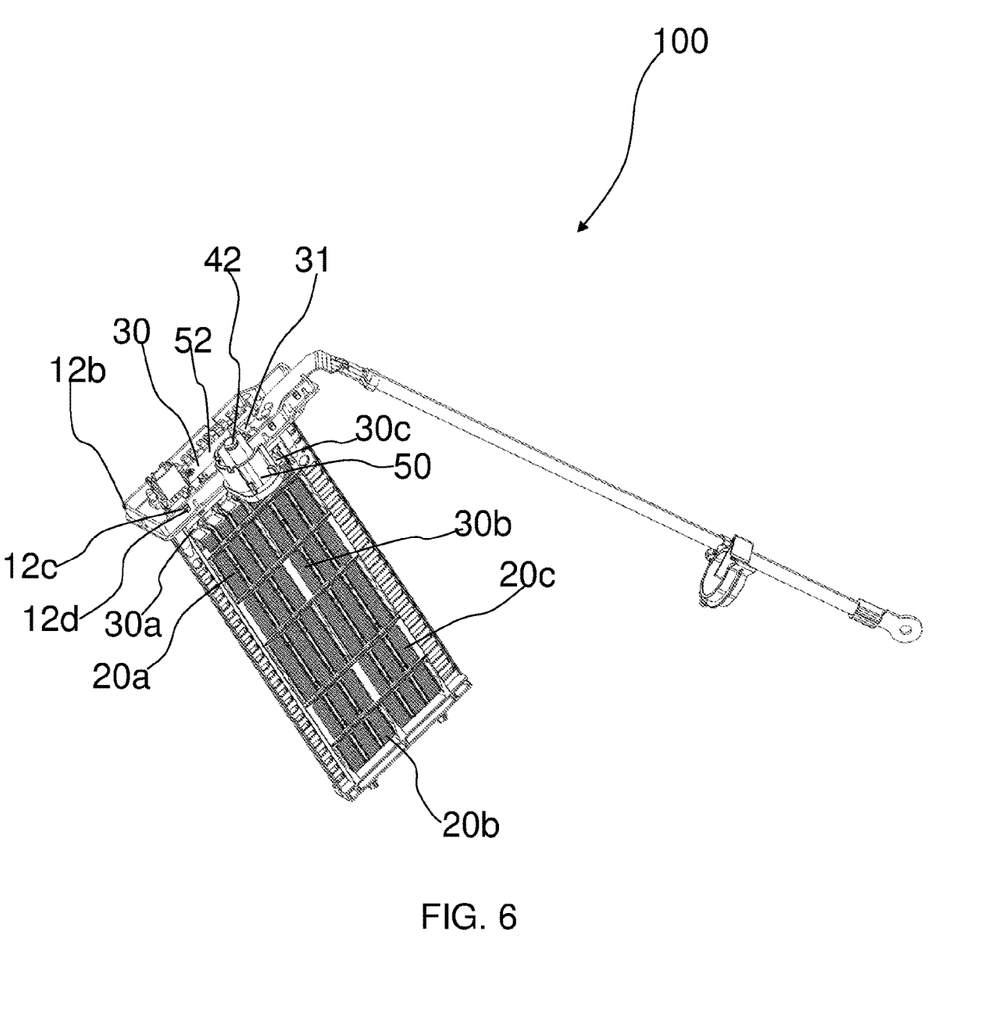
Figure 7:
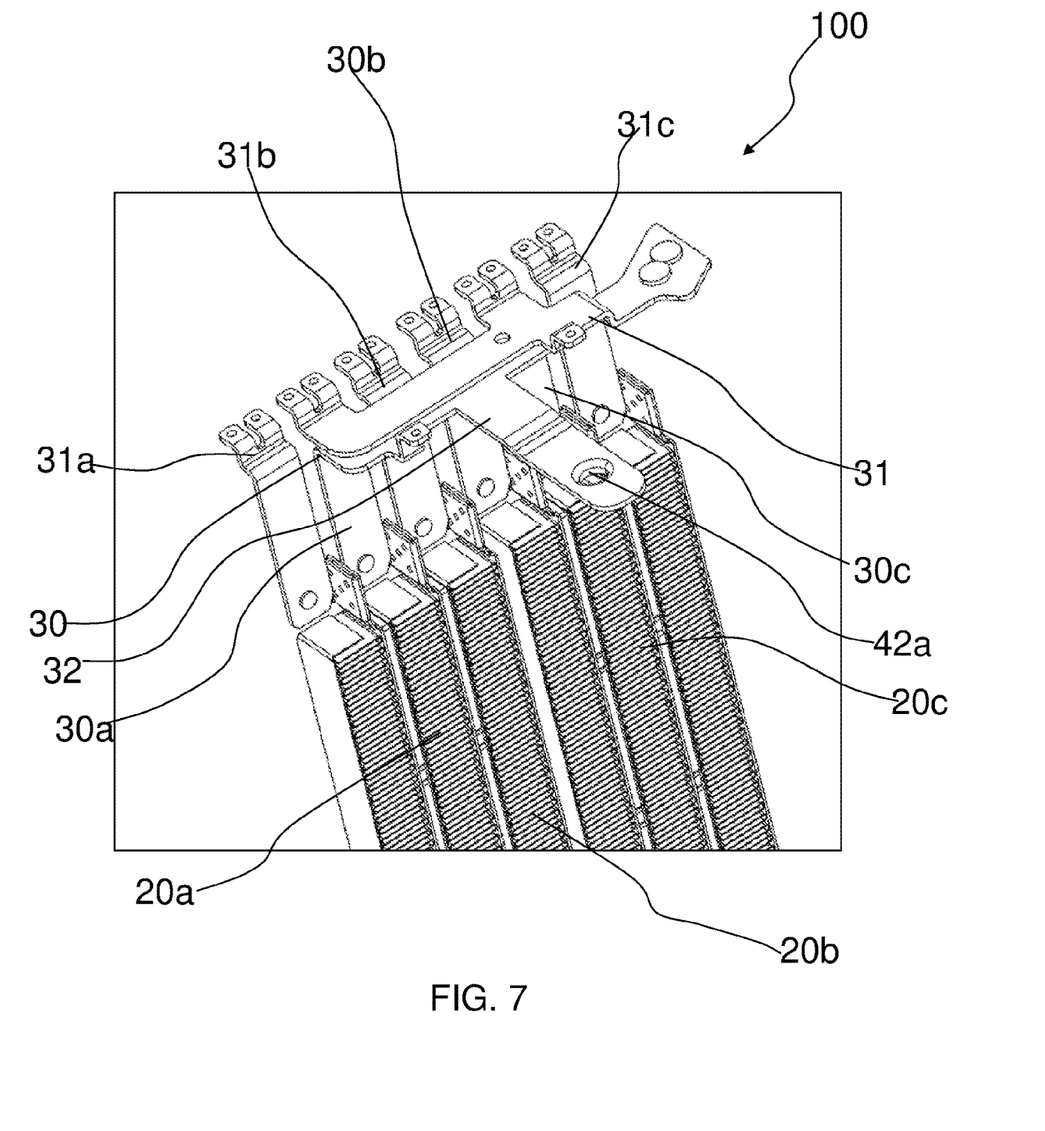
FIG. 7 illustrates another isometric view of the heating device of FIG. 4b depicting the pair of bus bars.

In accordance with an embodiment of the present invention as illustrated in FIG. 2a-FIG. 2b, the power connector housing 50 extends out of the casing 12 from a side of the casing 12. More specifically, the power connector housing 50 includes a base portion 50a, at least one supporting member 52 extending from the base portion 50a and a tubular portion formed on the base portion 50a. The tubular portion of the power connector housing 50 is configured with an open extreme end and an open side 50b. The at least one supporting member 52 extends sideways from the base portion 50a and is received inside the casing 12 and is disposed over the bus bars 30, 31 as illustrated in FIG. 2a. In accordance with an embodiment of the present invention, the power connector housing 50 is integrally formed with the at least one supporting member 52 or the side of the casing 12. In accordance with an embodiment of the present invention, the at least one supporting member 52 and the power connector housing 50 are of plastic material. In accordance with another embodiment of the power connector housing 50 is detachably mounted either on side of the casing 12 or the at least one supporting member 52. The at least one supporting member 52 further supports the Printed Circuit board (PCB) thereon as illustrated in FIG. 2b. The base portion 50a extends along the outwardly extending connecting portion 32 connecting the terminal pin 42 disposed outside the casing 12 with the bus bar 30 disposed inside the casing 12 to connect with the supporting member 52. The open extreme end along with the open side 50b of the power connector housing 50 facilitates receiving of the power connector 40 inside the power connector housing 50. The power connector 40 is connected to a cable supplying operating power and also detachably engages with the terminal pin 42 as illustrated in FIG. 5b to configure assembly between the power connector 40 and the terminal pin 42 as illustrated in FIG. 5c. FIG. 5a illustrates an isometric view of the power connector 40. The tubular portion of the power connector housing 50 is complimentary to an external profile of the power connector 40 and receives the power connector 40 that engages with the terminal pin 42 received inside the power connector housing 50. FIG. 4a and FIG. 4b illustrate isometric views of the heating device 100, wherein the bus bar terminals 30a and 30c of the bus bar 30 are depicted configuring connection between the heating elements 20a and 20c and the Printed Circuit Board (PCB) 11. FIG. 6 illustrates another isometric view of the heating device 100 with the power connector housing 50 disposed outside the casing 12. FIG. 7 illustrates another isometric view of the heating device 100 depicting the pair of bus bars 30 and 31.

With such configuration, the power connector 40 engaging with the terminal pin 42 is disposed outside the casing 12 instead of being disposed in the confined space inside the casing 12 or above the top face of the casing 12, thereby providing sufficient space for configuring secure connection between the terminal pin 42 and any configuration of the power connector 40 without requiring any modification of the casing 12, particularly, in cases where there is limited space above the casing 12. Further, such configuration ensures normal secure connection between the terminal pin 42 and the power connector 40 without damaging electronic elements disposed inside the casing 12. Further, such configuration of the power connector housing 50 provides flexibility to position or select different shapes, sizes and configurations of the engaging terminal pin 42 and the power connector 40.

Several modifications and improvement might be applied by the person skilled in the art to the heating device 100 as defined above and such modifications and improvements will still be considered within the scope and ambit of the present invention, as long the heating device includes a Printed Circuit Board, at least one heating element, a bus bar and a terminal pin. The Printed Circuit Board is received inside a casing along with the bus bar. The bus bar includes at least one bus bar terminal, wherein at least one bus bar terminal connects a corresponding heating element to the Printed Circuit Board (PCB). The terminal pin is integrally formed with at least one bus bar terminal and is disposed outside the casing.

In any case, the invention cannot and should not be limited to the embodiments specifically described in this document, as other embodiments might exist. The invention shall spread to any equivalent means and any technically operating combination of means.

The invention claimed is:

1. A heating device for a vehicle, the heating device comprising:
   a Printed Circuit Board (PCB) received inside a casing;
   at least one heating element;
   a pair of bus bars connected to the Printed Circuit Board (PCB), at least one bus bar is configured with at least one bus bar terminal adapted to at least partially extend out of the casing and adapted to facilitate connection between the at least one heating element and the Printed Circuit Board (PCB); and
   a terminal pin connected with the at least one bus bar terminal, wherein the terminal pin is disposed outside the casing,
   wherein the terminal pin is received inside a power connector housing disposed outside the casing, and
   wherein the power connector housing comprises at least one supporting member adapted to extend therefrom and be received inside the casing and over the bus bars.

2. The heating device as claimed in the claim 1, wherein the power connector housing is having tubular configuration with a closed end forming a base portion, an open extreme end and an open side.

3. The heating device as claimed in the claim 1, wherein the at least one supporting member is further adapted to support the Printed Circuit board (PCB) thereon.

4. The heating device as claimed in claim 1, wherein the power connector housing is adapted to receive a power connector configured to engage with the terminal pin received in the power connector housing.

5. The heating device as claimed in claim 1, wherein the casing comprises a first portion and a second portion configured with complimentary engaging elements and for facilitating engagement between the first portion and the second portion to configure an enclosure.

6. The heating device as claimed in claim 5, wherein the complimentary engaging elements and are apertures and complimentary snap fit engagement elements respectively.

7. The heating device as claimed in claim 1, wherein the terminal pin is integrally formed on a portion of bus bar extending out of the casing.

8. The heating device as claimed in claim 1, wherein the terminal pin is detachably mounted on the portion of the bus bar terminal extending out of the casing.

9. The heating device as claimed in claim 2, wherein the base portion extends along an outwardly extending connecting portion connecting the terminal pin with the at least one bus bar.

* * * * *